United States Patent
Hasegawa

(10) Patent No.: US 8,869,829 B2
(45) Date of Patent: Oct. 28, 2014

(54) PRESSURE RELEASE VALVE ASSEMBLY FOR PRESSURE COOKER

(76) Inventor: Tom Hiroshi Hasegawa, Gardena, CA (US)

( * ) Notice: Subject to any disclaimer, the term of this patent is extended or adjusted under 35 U.S.C. 154(b) by 441 days.

(21) Appl. No.: 13/369,135

(22) Filed: Feb. 8, 2012

(65) Prior Publication Data

US 2013/0199633 A1    Aug. 8, 2013

(51) Int. Cl.
| | |
|---|---|
| *F16K 15/06* | (2006.01) |
| *F16K 17/06* | (2006.01) |
| *F16K 37/00* | (2006.01) |
| *A47J 36/06* | (2006.01) |
| *A47J 27/09* | (2006.01) |

(52) U.S. Cl.
CPC ..................... *A47J 27/09* (2013.01)
USPC .... 137/543.13; 137/524; 137/556; 20/203.05

(58) Field of Classification Search
CPC ....................................... A47J 27/09
USPC .................. 99/337; 137/524, 536, 538, 542, 137/543.13, 556, 557; 220/203.04, 203.05
See application file for complete search history.

(56) References Cited

U.S. PATENT DOCUMENTS

| | | | | |
|---|---|---|---|---|
| 2,097,585 | A | * | 11/1937 | Carson ............................ 236/61 |
| 2,463,516 | A | * | 3/1949 | Burkhardt ..................... 137/524 |
| 2,524,996 | A | * | 10/1950 | Sayers .......................... 137/516 |
| 2,536,505 | A | * | 1/1951 | Kircher ......................... 137/529 |
| 2,570,655 | A | * | 10/1951 | Druge ........................... 137/493 |
| 2,619,982 | A | * | 12/1952 | Turner .......................... 137/467 |
| 2,667,891 | A | * | 2/1954 | Hilldale ........................ 137/470 |
| 2,710,627 | A | * | 6/1955 | Wagner et al. ................ 137/540 |
| 3,949,781 | A | * | 4/1976 | Scalabrin ...................... 137/532 |
| 4,711,366 | A | * | 12/1987 | Chen ............................. 220/316 |
| 5,507,311 | A | * | 4/1996 | Combe ......................... 137/524 |
| 7,726,508 | B2 | | 6/2010 | Hasegawa |
| 2010/0193521 | A1 | | 8/2010 | Hasegawa |

* cited by examiner

*Primary Examiner* — Stephen M Hepperle
*Assistant Examiner* — Frederick D Soski
(74) *Attorney, Agent, or Firm* — DLA Piper LLP (US)

(57) ABSTRACT

A pressure release valve assembly for a pressure cooker including a pressure intake unit provided inside of (or under) the lid of a pressure cooker and a pressure control unit connected to the pressure intake unit and provided outside of the lid. The pressure intake unit includes a pressure outlet tube, a connecting plug substantially in a truncated conical shape and connected to the pressure outlet tube with the connecting plug in between, a pressure intake tube connected to the pressure outlet tube, and a filtering cap attached to the pressure intake tube; and the pressure control unit includes a cylindrical pressure release casing, a tubular pressure control element threadedly connected to the inside of the pressure release casing, a valve plunger provided inside the tubular pressure control element, and a pressure spring installed between the pressure control element and an externally expanding supporting flange of the valve plunger.

6 Claims, 4 Drawing Sheets

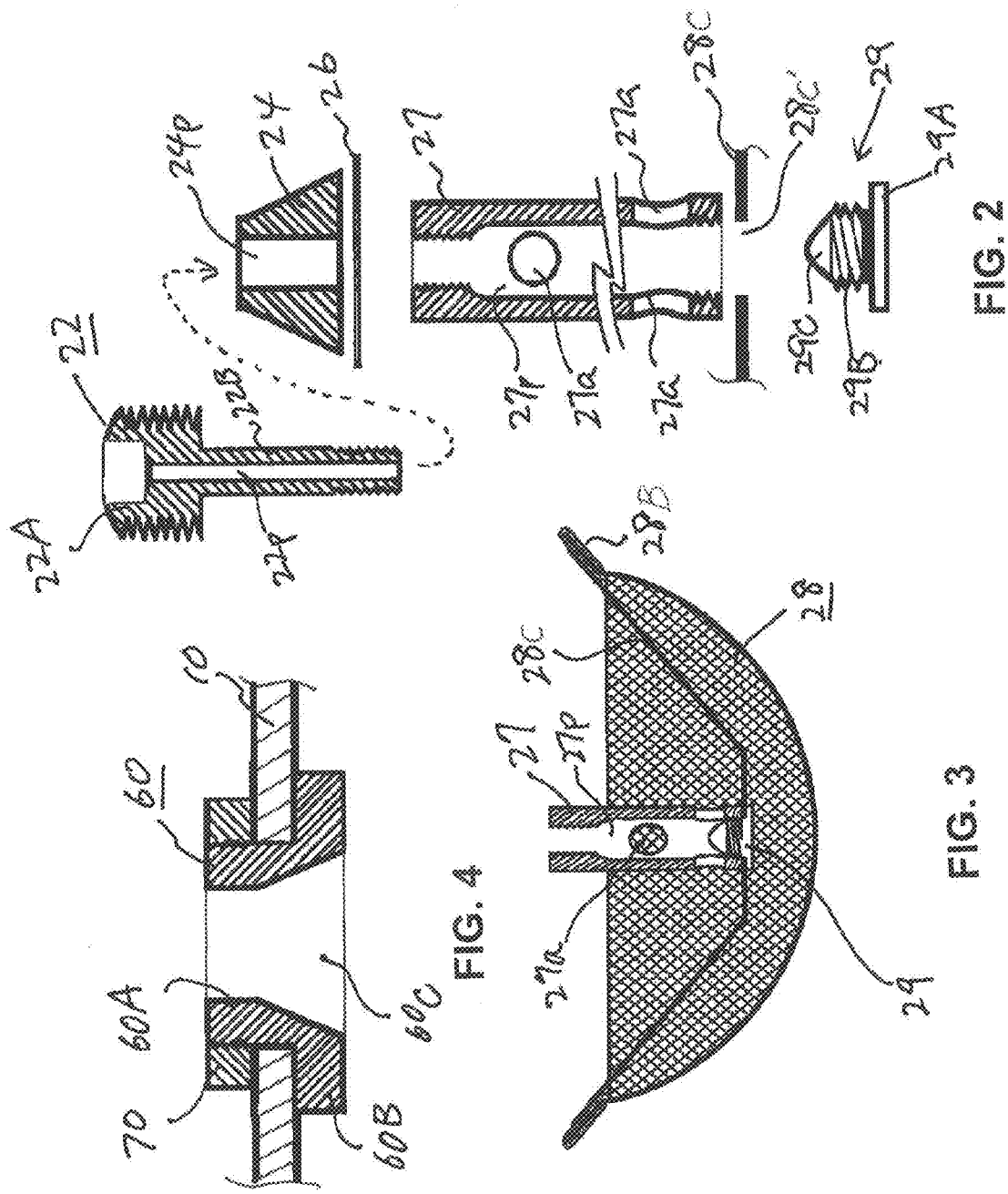

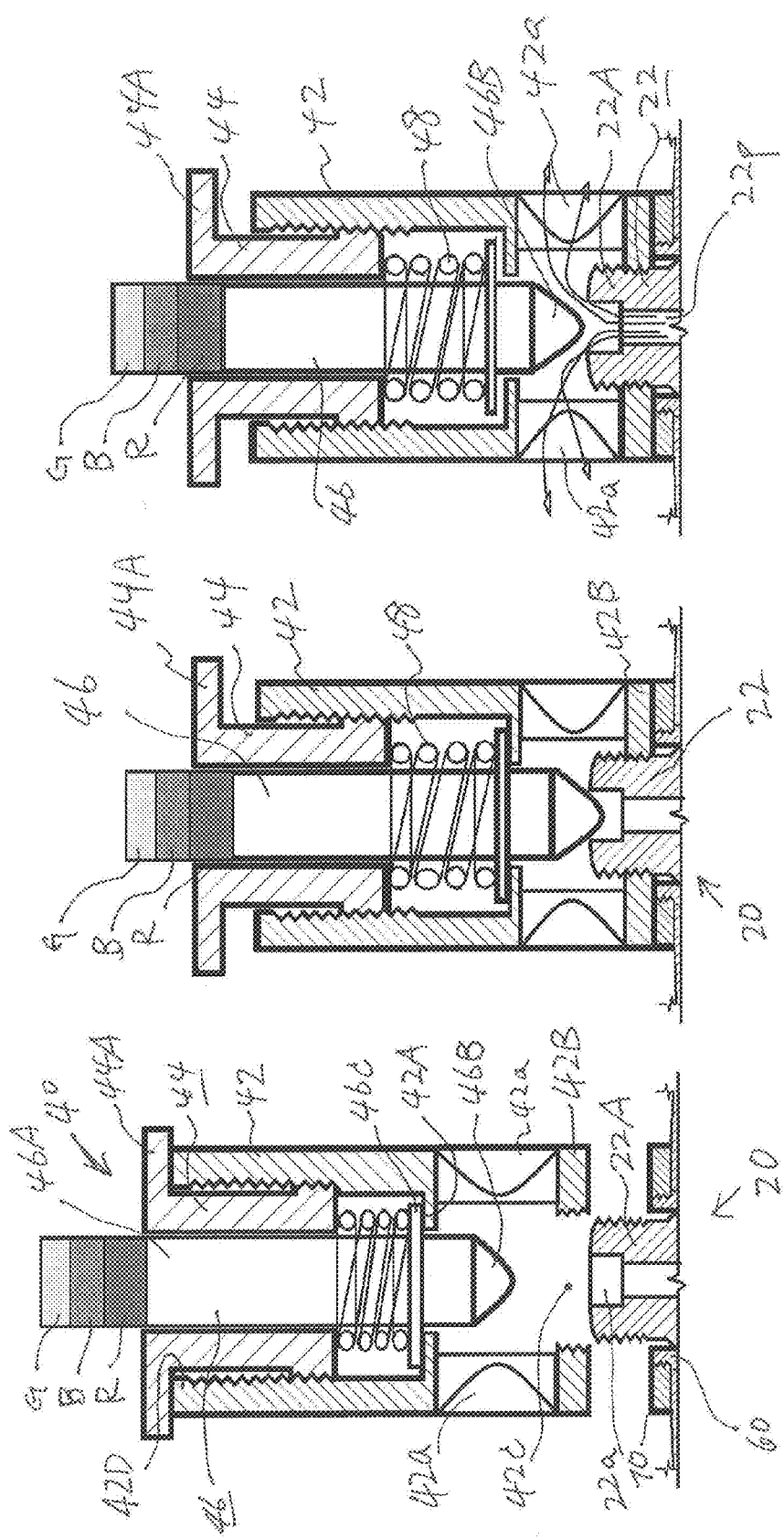

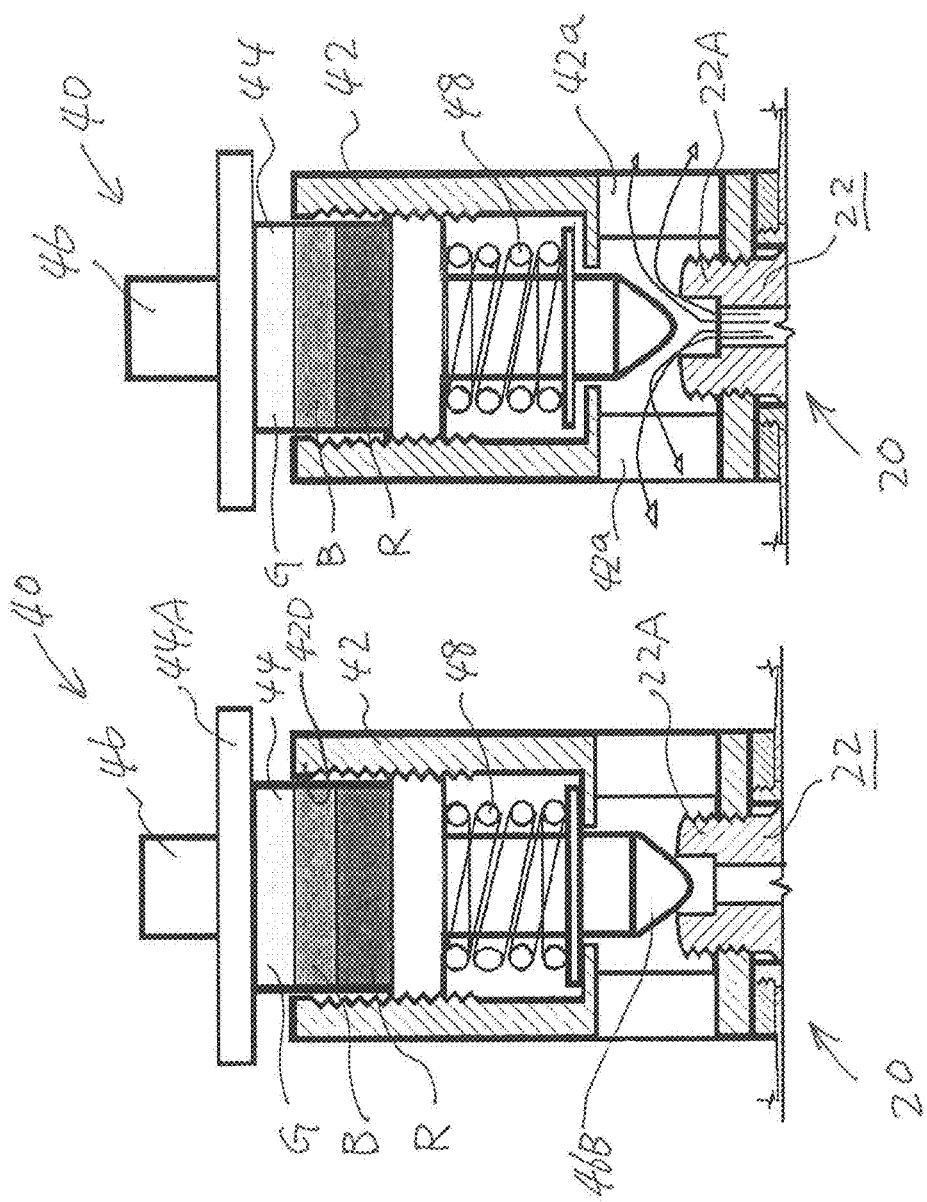

PRESSURE RELEASE VALVE ASSEMBLY FOR PRESSURE COOKER

BACKGROUND OF THE INVENTION

1. Field of the Invention

The present invention relaters to a pressure cooker and more specifically to a pressure release valve assembly used in a pressure cooker.

2. Prior Art

A pressure cooker that utilizes high-temperature and high-pressure steam to cook food inside the pot has been well known and used widely. Unfortunately, there is an omnipresent risk of explosion caused by too much pressure inside the pot. This risk is very real because a pressure cooker prohibits the free circulation of air between the interior and the exterior of the pot and cooks food under high-pressure and high-temperature conditions. So as to prevent this risk, several different counter measures have been taken, including using sturdier materials to construct pots, utilizing a timer to control the length of heating time, installing a pressure gauge to monitor the atmospheric pressure inside, installing a pressure release valve, and/or installing a safety cap made of metal mesh casing.

A pressure release valve for a pressure cooker that uses a safety cap is first disclosed by the inventor of the present application in the U.S. Pat. No. 7,726,508 and in the U.S. Patent Application Publication No. 2010-0193521. The safety valve is a device that is physically attached to a pressure cooker, and its function is to release the pressure or pressurized steam in a pot when the atmospheric pressure within the pot exceeds a pre-set point. The safety valve is usually installed in the lid of a pressure cooker. The portion of the safety valve outside of the lid is shaped like a pipe having apertures through which the pressurized steam gets into the pipe. The portion of the safety valve inside of (or under) the lid is an extension of the interior pipe, and it has a spring-laden cylindrical valve plunger and an aperture for releasing the pressurized steam in its wall. A safety cap is attached to the lower end of the interior portion of the valve to prevent food particles from coming into the safety valve and thus to avoid the valve from being clogged by the food particles and to prevent explosion of the pressure cooker. The safety cap works well to prevent clogging of the safety valve and therefore to prevent explosion of pressure cookers, providing safety and secure use of pressure cookers. Nonetheless, users can remove the safety cap from the lid of a pressure cooker for the purpose of cleaning; as a result, a user could forget to put the safety cap back on the pressure release valve or fail to completely attach the safety cap back on the pressure release valve, leading to eventual undesired consequences.

SUMMARY OF THE INVENTION

Accordingly, it is an object of the present invention to provide a pressure release valve assembly that can be securely attached to the lid of a pressure cooker and removable and restorable with the safety during the use is assured.

The above object is accomplished by a unique structure of the present invention for a pressure release valve assembly that includes a pressure intake unit and a pressure control unit wherein:

the pressure intake unit includes:
  a pressure outlet tube formed therein with an axially extending pressure outlet passage and having a pressure outlet portion at the top part thereof;
  a pressure intake tube formed therein with an axially extending pressure outlet passage that communicate with the pressure outlet passage of the pressure outlet tube and provided with pressure intake openings,
  a connecting plug in substantially a truncated conical shape with the outer diameter decreasing from the lower portion to the upper portion and provided between the pressure outlet tube and the pressure intake tube, and
  a dome-shaped filtering cap provided in the lower end of the pressure intake tube so as to spacedly surround the pressure intake tube; and the pressure control unit includes:
  a cylindrical pressure release casing provided with pressure release openings in a lower portion thereof and connected at the bottom to the pressure outlet tube of the pressure intake unit,
  a tubular pressure control element threaddedly connected to the upper inside of the pressure release casing,
  a valve plunger installed in the pressure control element and comprised of a shank portion and a beveled valve portion that is under the shank portion with the shank portion formed with an externally expanding supporting flange above the valve portion; and
  a coil spring provided around the shank portion of the valve plunger and between the lower end of the pressure control element and the upper surface of the supporting flange of the valve plunger.

In this structure, the connecting plug can be substantially in a truncated conical shape having the outer diameter decreasing from its lower portion to its upper portion, and the filtering cap can be a dome-shaped mesh casing.

With the structure above, the pressure intake unit that includes the filtering cap that is formed as a single unit comprising the pressure outlet tube, the connecting plug in substantially a truncated conical shape, the pressure intake tube, and the filtering cap. Accordingly, unless this single pressure intake unit is connected to the pressure control unit, a pressure control valve is not formed or provided on a lid of the pressure cooker, and thus a pressure cooker is not configured; and as a result, an incident that a user forget to attach the filtering cap, which is the safety cap, or fail to completely attach the filtering or safety cap to the lid of a pressure cooker can be prevented.

Furthermore, in the above structure, the pressure outlet portion of the pressure outlet tube of the pressure intake unit is externally threaded, so that the cylindrical pressure release casing of the pressure control unit can be easily threaddedly connected at its bottom to the pressure outlet tube of the pressure intake unit.

BRIEF DESCRIPTION OF THE SEVERAL VIEWS OF THE DRAWINGS

FIG. 2 illustrates one example showing the manner of connecting a pressure outlet tube, a connecting plug, a pressure intake tube, and a filtering cap used in the pressure release valve assembly of the present invention;

FIG. 3 is a cross-sectional view of the filtering cap attached to the pressure intake tube in the pressure release valve assembly of the present invention;

FIG. 4 is a cross-sectional view of an annular attachment nut used for the pressure release valve assembly;

FIG. 5 is a cross-sectional view of a pressure control unit and a part of a pressure intake unit of the pressure release valve assembly according to the present invention in which a valve plunger of the pressure control unit is color-coded;

FIG. 6 is a cross-sectional view of the pressure control unit and the part of the pressure intake unit of FIG. 5 in which they are connected to each other;

FIG. 7 is a cross-sectional view of the pressure control unit and the part of the pressure intake unit of FIGS. 5 and 6 during the use in a pressure cooker.

FIG. 8 is cross-sectional view, except for the tubular pressure control element, of another type of pressure control unit and a part of a pressure intake unit of the pressure release valve assembly according to the present invention in which the pressure control element is color coded; and FIG. 9 is a cross-sectional view of the pressure control unit and the part of the pressure intake unit of FIGS. 8 during the use in a pressure cooker.

DETAILED DESCRIPTION OF THE INVENTION

Figure 1:
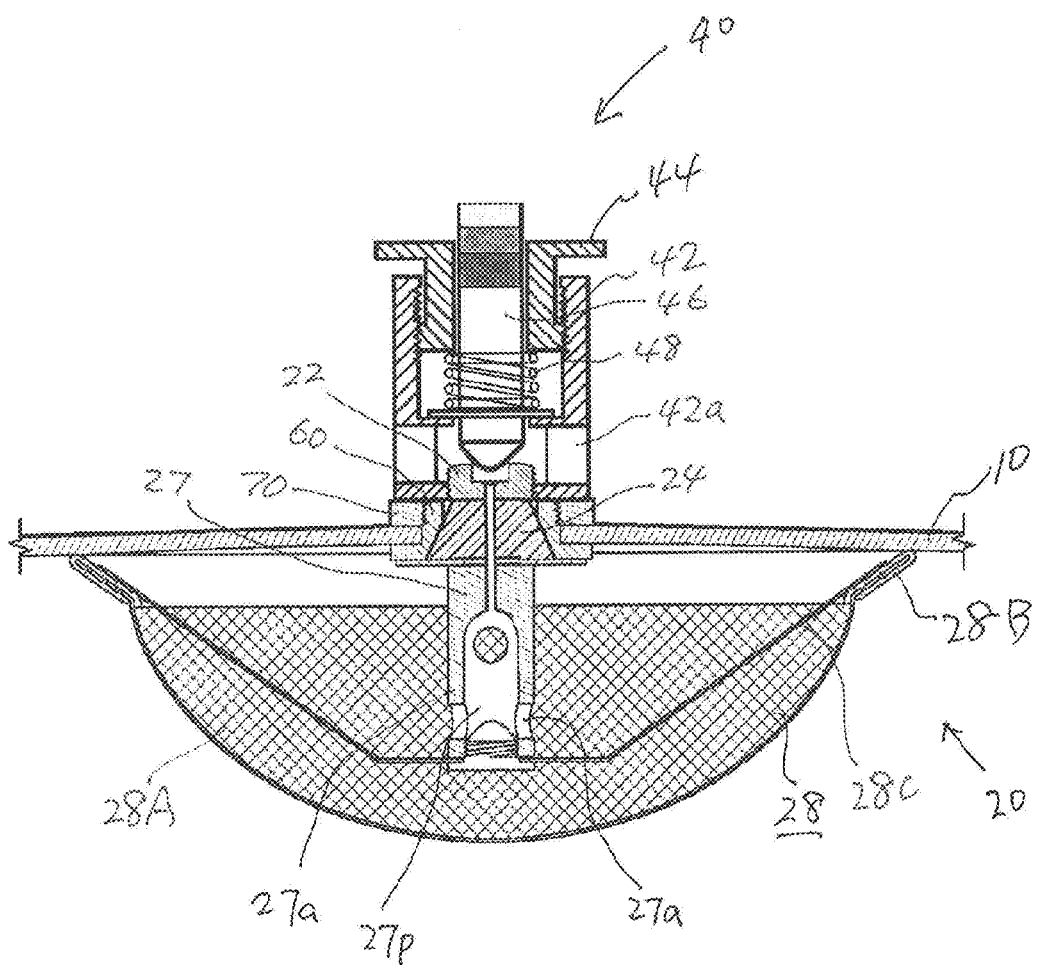
FIG. 1 is a cross-sectional view of a pressure release valve assembly for a pressure cooker according the present invention.

The pressure release valve assembly according to the present invention is, as shown in FIG. 1, comprised of two units that comprises a pressure intake unit 20 and a pressure control unit 40 which are thread-connected to each other with an annular attachment nut 60 in between so that the pressure intake unit 20 is inside of or underneath the lid 10 of a pressure cooker and the pressure control unit 40 is outside of or on the lid 10.

The pressure intake unit 20 is a one-piece unit that is substantially comprised of a pressure outlet tube 22, a connecting plug 24, a securing plate 26, a pressure intake tube 27 and a filtering cap 28.

The pressure outlet tube 22, as seen from FIG. 3, includes a pressure outlet portion 22A at the top and a main tube portion 22B that is formed therein with an axially extending pressure outlet path 22p at the center. The pressure outlet portion 22A of the pressure outlet tube 22 is eternally threaded, and so is the bottom portion of the main tube portion 22B of the pressure outlet tube 22. The pressure outlet tube 22 is typically made of stainless steel.

The connecting plug 24 is in substantially a truncated conical shape with its outer diameter gradually decreasing from its lower portion to its upper portion and has a central through hole 24a at the center. The connecting plug 24 is securely connected to the pressure outlet tube 22 by being pushed over the main tube portion 22B of the pressure outlet tube 22.

The connecting plug 24 is made of, for instance, silicone, and has a slanted circumferential surface that is about 60° with respect to its bottom surface. The connecting plug 24 is provided, at the bottom, with the securing plate 26 that has a diameter greater than the bottom of the connecting plug 24, and it is attached to the bottom of the connecting plug 24. An O-ring or a washer can be installed between the bottom of the connecting plug 24 and the securing plate 26. The connecting plug 24 can take a dome shape, a truncated pyramid shape, etc.

The pressure intake tube 27 is formed with pressure intake openings 27a and internally threaded at its upper end that is in contact with the securing plate 26. The pressure intake tube 27 is formed with an axially extending pressure outlet passage 27p at the center that communicates with the pressure outlet passage 22p of the pressure outlet tube 22.

The filtering cap 28 is comprised of a metal mesh casing 28A of a dome shape having numerous minute openings, a reinforcing circular frame 28B secured to the upper circumferential edge of the dome shaped metal mesh casing 28A and a diametrical bridge support 28C. Each of the openings of the mesh casing 28 is smaller in size than the pressure intake opening 27a of the pressure intake tube 27. The filtering cap 28 is attached at the center of its diametrical bridge support 28C to the lower end of the pressure intake tube 27 so as to spacedly surround the pressure intake tube 27.

More specifically, as seen from FIGS. 2 and 3, the bridge support 28C of the filtering cap 28 is formed with an attachment opening 28C', and an attachment plug 29, which is comprised of a base portion 29A, threaded portion 29B formed on the base 29A and a head portion 29C formed on the threaded portion 29B, is inserted into this attachment opening 28C' and further into the pressure intake tube 27 and screwed to the lower end of the pressure intake tube 27. The bridge support 28C (and therefore the filtering cap 28) is thus attached to the pressure intake tube 27 so that the ring-shaped reinforcing circular frame 28B on the outer circumferential edge of the filtering cap 28 is (as seen from FIG. 1) in contact with the inner surface of the lid 10 of a pressure cooker. Further, the base portion 29A of the attachment plug 29 is secured to the bridge support 28C of the filtering cap 28 by the known lock-seal method so that the attachment plug 29 is not unscrewed from the pressure intake tube 27 and the filtering cap 28 is thus not removed from the pressure intake tube 27. The head portion 29C of the attachment plug 29 has a conical shape, so that, as will be described below, any fluid is prevented from staying thereon and can easily flow down to the outside of the filtering cap 28.

FIG. 3 further illustrates one example to show how the pressure intake unit 20 is formed into a one-piece single unit. As noted above, the pressure outlet tube 22 is formed with an external thread on the lower outer surface, and the pressure intake tube 27 is formed with an internal thread on the upper internal surface. The upper end of the pressure intake tube 27, which has an external diameter larger than the inner diameter of the central through hole 24a of the connecting plug 24 and a central hole of the securing plate 26, is brought into contact with the bottom of the connecting plug 24 with the securing plate 26 in between, and then the main tube portion 22B (having an outer diameter substantially the same as the diameter of the central through hole 24a of the connecting plug 24) of the pressure outlet tube 22 is forced into the central through hole 24b of the connecting plug 24 so that the external thread of the main tube portion 22B of the pressure outlet tube 22 and the internal thread of the pressure intake tube 27 are threadedly engaged with each other and the pressure outlet tube 22 is connected to the pressure intake tube 27 when the pressure intake tube 27 is turned. The pressure outlet tube 22, the connecting plug 24, the securing plate 26 and the pressure intake tube 27 thus make a one-piece unit.

The pressure control unit 40 that is adapted to make a screw-engagement with the above-described pressure intake unit 20, as seen from FIG. 1 (and FIG. 5), comprises a cylindrical pressure release casing 42, a tubular pressure control element 44, a valve plunger 46 and a pressure spring 48.

The pressure release casing 42 is a hollow cylindrical body with its upper end opened and formed at its lower portion pressure release openings 42a. The pressure release casing 42 has an internally extending stopper flange 42A defining the upper edge of the pressure release openings 42a, and it further has a bottom plate 42B. The bottom plate 42B is formed with an internally threaded bottom opening 42C that has an inner diameter substantially the same as the outer diameter of the pressure outlet portion 22A of the pressure outlet tube 22. The pressure release casing 42 is thus connected at its bottom plate 42B to the pressure outlet tube 22 with the internal thread of the bottom opening 42C being screwed to the external thread of pressure outlet portion 22A of the pressure outlet tube 22. The pressure release casing 42 can be formed on the upper end inside portion with a stopper 42D that extends internally, so that the cylindrical pressure control element 44 (and therefore the pressure spring 48 and the valve plunger 46 as well) is prevented from being pulled out of or removed from the pressure release casing 42.

The tubular pressure control element 44 is a hollow cylindrical body with its outer surface externally threaded and has a turning disk 44A at the top. The pressure control element 44 is threadedly inserted into the pressure release casing 42 through the top opening of the pressure release casing 42 and threadedly connected to the pressure release casing 42. Thus, when the tubular pressure control element 44 is turned by hand of a user via the turning disk 44A, it can be moved axially up and down within the pressure control element 44.

The valve plunger 46 typically made of metal provided in the tubular pressure control element 44 is comprised of a shank portion 46A and a beveled valve portion 46B that is at the lower end of the shank portion 46A. The valve plunger 46 is further formed with an outwardly expanding supporting flange 46C so that this supporting flange 46C sits on the stopper flange 42A of the pressure release casing 42. The valve portion 46B is designed so that the tip (lower) end thereof can snugly enter into the opening 22a of the pressure outlet portion 22A of the pressure outlet tube 22 (see FIG. 6). The valve plunger 46 can be color-coded. The color-code, indicated by letter C in FIG. 1, can be comprised of, for instance, red (R), blue (B), and green (G) colors provided, in this order from the bottom, in a band pattern at the upper end portion of the valve plunger 46 so as to indicate the level of inside pressure of the pot of a pressure cooker during the use of the pressure cooker.

The pressure spring 48 is a coil spring and is provided around the shank portion 46A of the valve plunger 46. The upper end of the pressure spring 48 is in touch with the lower end of the pressure control element 44 and the lower end of the spring 48 is in touch with the upper surface of the supporting flange 46C of the shank portion 46A of the valve plunger 46.

With the structures described above, the one-piece pressure intake unit 20 is mounted to the lid 10 of a pressure cooker by being threadedly connected to the pressure control unit 40 with the annular attachment nut 60.

Here, as seen from FIG. 4, the annular attachment nut 60, made of forced aluminum or slightly elastic material, comprises a cylindrical portion 60A in its upper portion and a circumferential collar 60B in its lower portion and is formed in its lower inside area with a receiving section 60C which is in a truncated conical shape that snugly mates with and receives the external configuration of the connecting plug 24 of the pressure intake unit 20 that is also of a truncated conical shape. The receiving section 60C can take other shapes so as to mate with and receive a connecting plug 24 that is of a dome shape, a truncated pyramid shape, etc. The cylindrical portion 60A of the attachment nut 60 is externally threaded so as to be threadedly engaged with a fixing ring 70.

The pressure intake unit 20 and the pressure control unit 40 are connected to each other and mounted in the lid 10 of a pressure cooker in the following matter as seen from FIG. 5: The annular attachment nut 60 is first inserted from below into an attachment opening opened at substantially the center of the lid 10 so that the upper surface of the circumferential collar 60B (having greater diameter than that of the attachment opening of the lid) of the attachment nut 60 come in contact with an area surrounding the attachment opening on the lower surface of the lid 10. A fixing ring 70 having internal thread is screwed to cylindrical portion 60A of the attachment nut 60, thus securing the attachment nut 60 to the lid 10 in such a manner that the lid 10 is sandwiched by the fixing ring 70 and the circumferential collar 60B of the attachment nut 60.

Then, the pressure outlet tube 22 of the pressure intake unit 20 is inserted into the receiving section 60C of the attachment nut 60 so that the connecting plug 24 of the pressure intake unit 20 snugly mate with and fitted in the receiving section 60C of the attachment nut 60 with the slanted exterior circumferential surface of the connecting plug 24 and the slanted interior circumferential surface of the attachment nut 60 in contact with each other and so that the upper surface of the securing plate 26 comes into contact with the lower surface of the circumferential collar 60B of the attachment nut 60.

The pressure control unit 40 is then brought above the attachment nut 60 and is connected to the pressure intake unit 20 by screwing the bottom plate 42B of the pressure release casing 42 of the pressure control unit 40 to the pressure outlet portion 22A of the pressure outlet tube 22 of the pressure intake unit 20, thus completing the connection of the pressure intake unit 20 and the pressure control unit 40.

In use, after setting the lid, on which the pressure release valve assembly is mounted as described above, on the pot of a pressure cooker, the pressure control element 44 is (see FIG. 6) turned so as to be moved up in the direction away from (or moved down towards) the pressure intake unit 20, allowing the pressure spring 48 to expand (or the pressure spring 48 to be compressed) so that a desired pressure release level is set (at this point, a part of the color-coded band indicative of "safe" (which is represented by, for instance, blue) at the upper end of the valve plunger 46 is out of the pressure control element 44 and is visible).

As cooking process progresses, the pressure inside the pot of the pressure cooker increases. Since the connecting plug 24 has a truncated conical shape, the connecting plug 24 receives increased pressure and makes assured contact with attachment nut 60 with their slanted surfaces, thus forming a good sealing for the pressure cooker.

As the cooking further progresses, the moisture in the contents of the pressure cooker turns into steam; and pressurized steam builds up, and the pressurized steam enters the pressure release passage 27p of the pressure intake tube 27 and further into the pressure outlet passage 22p of the pressure outlet tube 22. The pressure cooking by the pressure cooker continued in this manner. However, when the pressure inside the pot becomes higher than the level set by the pressure control element 44 and pressure spring 48, the pressure, overcoming the set spring force of the spring 48, pushes up the valve plunger 46, allowing the lowest color code such as, for example, the red band (R) indicative of "danger" to be visible, and separating the valve portion 46B of the valve plunger 46 from the pressure outlet portion 22A of the pressure outlet tube 22. As a result, the internal pressure or pressurized steam is released out through the pressure release openings 42a of the pressure release casing 42 of the pressure control unit 40 (see arrows in FIG. 7), lowering the valve plunger 46 to come back into contact with the pressure outlet portion 22A of the pressure outlet tube 22, allowing the upper color code such as, for example, the blue band (B) indicative of "safe" to be visible, and the internal pressure inside the pot can be kept at a desired level for the intended cooking.

Since the filtering cap 28 is attached to the pressure intake tube 27 and the ring-shaped reinforcing frame 28B of the filtering cap 28 is in contact with the interior surface of the lid 10, food particles produced during the cooling can be prevented from entering the pressure outlet passages of the pressure intake unit 20, and the pressure intake unit 20 can be prevented from clogging.

After the pressurized steam releasing process, the moisture starts to condense inside the pressure release passages 22p and 27p and changes into fluid. This fluid flows down along the wall surface of the pressure release passages 22p and 27p onto the attachment plug 29 of the filtering cap 28. Since the attachment plug 29 has the dome-shaped conical head 29C, the moisture or fluid can easily flows out of the filtering cap 28 back into the pot. Rusting of the filtering cap 28 can be thus prevented.

Since the one-piece pressure intake unit 20 and the pressure control unit 40 have simple structures and can be mounted on the lid of a pressure cooker easily, they can be designed in any desired size, so that they can be used in a large scale cooking pot such as stock pots.

FIG. 8 shows a structure of the pressure control unit 40 different from the one shown in the above description.

In this structure of the pressure release valve assembly of FIG. 8, the color code is provided on the outer surface of the tubular pressure control element 44 and not on the valve plunger 46. The structure of the pressure control element 44 (and of the valve plunger 46) is the same as that shown in FIGS. 1 and 5 through 7. The color-code, as in that shown in FIGS. 1 and 5 through 7, can be comprised of, for instance, red (R), blue (B), and green (G) colors provided, in this order from the bottom, in a band pattern on the outside circumferential surface of the pressure control element 44 so as indicate the level of inside pressure of the pot of a pressure cooker during the use of the pressure cooker.

In this structure of FIG. 8 as well, the pressure control unit 40 is threadedly connected to the pressure intake unit 20 by screwing the pressure release casing 42 of the pressure control unit 40 to the pressure out let tube 22 of the pressure intake unit 20. Furthermore, in this structure of FIG. 8 as well, the pressure release casing 42 can be formed on the upper end inside portion with a stopper 42D, so that the cylindrical pressure control element 44 (and therefore the pressure spring 48 and the valve plunger 46 as well) is prevented from being pulled out of or removed from the pressure release casing 42.

In the above structure, as shown in FIG. 9, the pressure control element 44 is turned by hand of a user via the turning disk 44A so as to be moved in the direction away from (or moved down towards) the pressure intake unit 20, allowing the pressure spring 48 to expand (or the pressure spring 48 to be compressed), until a desired pressure release level is set and a part of the color-coded band indicative of the set desired pressure release level (which is represented by, for instance, green (G)) at the upper end of the pressure control element 44 is out of the pressure release casing 42 and visible. When the pressure inside the pot becomes higher than the level set by the pressure control element 44 and pressure spring 48, the pressure, overcoming the set spring force of the spring 48, pushes up the valve plunger 46, separating the valve portion 46B of the valve plunger 46 from the pressure outlet portion 22A of the pressure outlet tube 22. As a result, the internal pressure or pressurized steam is, as indicated by arrows, released out through the pressure release openings 42a of the pressure release casing 42 of the pressure control unit 40, and the internal pressure inside the pot can be kept at a desired level for the intended cooking. In this structure of FIGS. 8 and 9, watching the color code provided on the pressure control element 44, the pressure release level set initially can be changed by turning the pressure control element 44 during the pressure cooking.

The invention claimed is:

1. A pressure release valve assembly including a pressure intake unit and a pressure control unit wherein:
    the pressure intake unit comprises:
        a pressure outlet tube formed therein with an axially extending pressure outlet passage and having a pressure outlet portion at a top part thereof;
        a pressure intake tube provided with a pressure intake opening and formed therein with an axially extending pressure outlet passage that communicates with the pressure outlet passage of the pressure outlet tube,
        a connecting plug provided between the pressure outlet tube and the pressure intake tube, and
        a filtering cap attached to a lower end of the pressure intake tube so as to spacedly surround the pressure intake tube; and
    the pressure control unit comprises:
        a cylindrical pressure release casing provided with a pressure release opening in a lower portion thereof and is adapted to be connected to the pressure outlet tube of the pressure intake unit,
        a tubular pressure control element threadedly connected to an upper inside portion of the pressure release casing,
        a valve plunger provided in the tubular pressure control element and comprised of a shank portion and a beveled valve portion under the shank portion with the shank portion formed with an externally expanding supporting flange above the valve portion; and
        a coil spring provided around the shank portion of the valve plunger and between a lower end of the pressure control element and the supporting flange of the valve plunger.

2. The pressure release valve assembly according to claim 1 wherein:
    said connecting plug is substantially in a truncated conical shape with an outer diameter decreasing from a lower portion to an upper portion thereof.

3. The pressure release valve assembly according to claim 1 wherein:
    said filtering cap is a dome-shaped mesh casing.

4. The pressure release valve assembly according to claim 1 wherein:
    said filtering cap is securely attached to said pressure intake tube so as not be removable from said pressure intake tube.

5. The pressure release valve assembly according to claim 1 wherein:
    said valve plunger is provided with a color code on an upper part thereof, said color code being indicative of a pressure level of inside a pressure cooker.

6. The pressure release valve assembly according to claim 1 wherein:
    said tubular pressure control element is provided with a color code on an outer circumferential surface thereof, said color code being indicative of a pressure level of inside a pressure cooker.

* * * * *